(12) United States Patent
Urman et al.

(10) Patent No.: US 12,244,671 B1
(45) Date of Patent: Mar. 4, 2025

(54) APPARATUS AND METHOD FOR IMPROVED NETWORK RESOURCE MANAGEMENT

(71) Applicant: Mellanox Technologies, Ltd., Yokneam (IL)

(72) Inventors: Avi Urman, Yokneam (IL); Ariel Shahar, Jersusalem (IL); Najeeb Darawshy, Iksal (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/242,637

(22) Filed: Sep. 6, 2023

(51) Int. Cl.
*G06F 15/16* (2006.01)
*H04L 67/143* (2022.01)

(52) U.S. Cl.
CPC .................................. *H04L 67/143* (2013.01)

(58) Field of Classification Search
CPC ............................. H04L 67/14; H04L 67/143
See application file for complete search history.

(56) References Cited

U.S. PATENT DOCUMENTS

| | | | |
|---|---|---|---|
| 7,245,627 B2 | 7/2007 | Goldenberg et al. |
| 8,370,675 B2 | 2/2013 | Kagan |
| 8,570,865 B2 | 10/2013 | Goldenberg et al. |
| 9,639,487 B1 | 5/2017 | Wentzlaff et al. |
| 9,753,854 B1 | 9/2017 | Bao |
| 9,787,612 B2 | 10/2017 | Steele et al. |
| 9,996,498 B2 | 6/2018 | Shahar et al. |
| 10,002,096 B1 | 6/2018 | Wentzlaff |
| 10,037,299 B1 | 7/2018 | Ramey et al. |
| 10,073,778 B1 | 9/2018 | Agarwal et al. |
| 10,095,543 B1 | 10/2018 | Griffin et al. |
| 10,158,702 B2 | 12/2018 | Bloch et al. |
| 10,237,156 B2 | 3/2019 | Belfer et al. |
| 10,367,741 B1 | 7/2019 | Ramey et al. |
| 10,394,653 B1 | 8/2019 | Rosenbluth |
| 10,394,747 B1 | 8/2019 | Paneah et al. |
| 10,528,519 B2 | 1/2020 | Rosenbluth |
| 10,789,175 B2 | 9/2020 | Tal et al. |
| 10,877,761 B1 | 12/2020 | Xu et al. |
| 11,171,884 B2 | 11/2021 | Mula et al. |
| 11,184,439 B2 | 11/2021 | Eran et al. |
| 11,516,135 B2 | 11/2022 | Aibester et al. |
| 11,637,739 B2 | 4/2023 | Aibester et al. |

(Continued)

*Primary Examiner* — John B Walsh
(74) *Attorney, Agent, or Firm* — Anup Iyer; Moore & Van Allen PLLC (57) ABSTRACT

Apparatus and method for improved network resource management are described herein. An example computing apparatus comprises a network adapter configured to: receive, via a network connection, a data packet from the communication network; determine, from the first memory block, a value of an extended portion of a local counter associated with the network connection in response to receiving the data packet; capture, from the second memory block, a value of a global counter; compare the value of the extended portion of the local counter with the value of the global counter; and in an instance in which the comparison identifies a mismatch: update the value of the extended portion of the local counter based on the value of the global counter; and set a current value of a bit indicating a status of the network connection, wherein the bit is associated with the plurality of bits.

23 Claims, 4 Drawing Sheets

(56) References Cited

U.S. PATENT DOCUMENTS

| | | |
|---|---|---|
| 11,742,869 B2 | 8/2023 | Zortea et al. |
| 2016/0292072 A1* | 10/2016 | Edwards ............. G06F 12/0261 |
| 2021/0350197 A1* | 11/2021 | Chow ................ G06Q 20/3829 |

* cited by examiner

APPARATUS AND METHOD FOR IMPROVED NETWORK RESOURCE MANAGEMENT

TECHNOLOGICAL FIELD

Example embodiments of the present disclosure relate to network resource management and, more particularly, to improved network resource management based on active connection determination using minimized memory access.

BACKGROUND

Network adapters (hardware), such as Network Interface Cards (NICs), play a crucial role in augmenting network efficiency by offloading tasks traditionally handled by the host processor (software), thereby conserving Central Processing Unit (CPU) cycles. One such functionality is the application of counters to track the data packets arriving at a specific network connection. However, using counters in such a manner often requires substantial computational resources and memory accesses.

Applicant has identified a number of deficiencies and problems associated with the use of counters for network resource management. Many of these identified problems have been solved by developing solutions that are included in embodiments of the present disclosure, many examples of which are described in detail herein.

BRIEF SUMMARY

Systems and methods, are provided for improved network resource management based on active connection determination using minimized memory access.

In one aspect, a computing apparatus for improved network resource management is presented. The apparatus comprising: a network adapter operatively coupled to a communication network; a first memory block operatively coupled to the network adapter; a second memory block operatively coupled to the network adapter; and a third memory block operatively coupled to the network adapter, wherein the third memory block comprises a plurality of bits indicating a status of a plurality of corresponding network connections, wherein the network adapter is configured to: receive, via a network connection, a data packet from the communication network; determine, from the first memory block, a value of an extended portion of a local counter associated with the network connection in response to receiving the data packet; capture, from the second memory block, a value of a global counter; compare the value of the extended portion of the local counter with the value of the global counter; and in an instance in which the comparison identifies a mismatch: update the value of the extended portion of the local counter based on the value of the global counter; and set a current value of a bit indicating a status of the network connection, wherein the bit is associated with the plurality of bits.

In some embodiments, the computing apparatus further comprising: a host processor, wherein the host processor is configured to: read and subsequently atomically clear, from the third memory block, the current value of the plurality of bits; determine a first subset of network connections that are inactive based on at least the current value of the plurality of bits; and release network connection resources associated with the first subset of the network connections.

In some embodiments, the host processor is configured to: increment the global counter in response to reading the current value of the plurality of bits from the third memory block.

In some embodiments, the host processor is configured to read the current value of the plurality of bits once every aging period.

In some embodiments, the host processor is further configured to: determine that the value of the global counter is a specific representational value; and set the value of the extended portion of the local counter corresponding to each network connection to an invalid value in an instance in which the value of the global counter is equal to the specific representational value.

In some embodiments, the host processor is further configured to: set the value of the global counter to an initial value upon setting the value of the extended portion of the local counter corresponding to each network connection to the invalid value.

In some embodiments, the specific representational value is a maximum representational value for the global counter.

In some embodiments, a size of the extended portion of the local counter is equal to a size of the global counter.

In some embodiments, the local counter associated with the network connection is configured to track a data payload and a number of data packets received via the network connection.

In some embodiments, the network connection comprises a transport control protocol (TCP)/Internet protocol (IP) connection.

In another aspect, a method for improved network resource management is presented. The method comprising: receiving, via a network connection, a data packet from a communication network; determining, from a first memory block, a value of an extended portion of a local counter associated with the network connection in response to receiving the data packet; capturing, from a second memory block, a value of a global counter; comparing the value of the extended portion of the local counter with the value of the global counter; and in an instance in which the comparison identifies a mismatch: updating the value of the extended portion of the local counter based on the value of the global counter; and setting a current value of a bit indicating a status of the network connection, wherein the bit is associated with a plurality of bits indicating a status of a plurality of corresponding network connections.

In yet another aspect, a computing apparatus for improved network resource management is presented. The apparatus comprising: a network adapter operatively coupled to a communication network; a memory operatively coupled to the network adapter; wherein the network adapter is configured to: receive, via a network connection, a data packet from the communication network; determine, from the memory, a value of an extended portion of a local counter associated with the network connection in response to receiving the data packet; capture, from the memory, a value of a global counter; compare the value of the extended portion of the local counter with the value of the global counter; and in an instance in which the comparison identifies a mismatch, update the value of the extended portion of the local counter based on the value of the global counter.

In some embodiments, the memory comprises a first memory block, a second memory block, and a third memory block, wherein the first memory block comprises the value of the extended portion of the local counter associated with the network connection, the second memory block comprises the value of the global counter, and the third memory block comprises a plurality of bits indicating a status of a plurality of corresponding network connections.

In some embodiments, the network adapter is further configured to: set a current value of a bit indicating a status of the network connection, wherein the bit is associated with the plurality of bits.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Overview

Network adapters (hardware), such as Network Interface Cards (NICs), play a crucial role in augmenting network efficiency by offloading tasks traditionally handled by the host processor (software), thereby conserving Central Processing Unit (CPU) cycles. One such functionality is the application of counters to track the data packets arriving at a specific network connection. This offloading effectively reduces the host processor's need to execute these counting operations, thereby releasing CPU cycles.

Certain layers of software might be oblivious to the arrival of a packet. With its acceptance entirely offloaded to hardware, these layers are unable to monitor the status of active network connections. Counters, managed by the receiving hardware, can be used in the aging process to determine whether a particular network connection is active. By observing the counter's progression, the software can determine whether a particular network connection is active. In scenarios where the network connection is assessed as inactive, the software can then release any resources allocated to maintaining that network connection, such that those resources can be used for other operations. On the other hand, if the connection remains active, the software can continue to allocate resources for its maintenance. Conventional methods of utilizing counters involve storing the values of counters corresponding to each network connection, followed by performing a read operation after a predefined aging cycle (e.g., 2 seconds), then conducting a comparative analysis of the stored values against the most recent ones. Differing counter values would reflect an active connection, whereas identical counter values would indicate an inactive connection during the given aging cycle. However, large-scale networks often have over a million network connections, with each network connection having a dedicated local counter of a significant size (e.g., 64 bits). Reading, storing, and performing a comparative analysis of millions of stored counter values against the most recent ones according to conventional methods often requires substantial computational resources and memory accesses.

Alternative conventional methodologies have proposed the use of a single bit to signify the status of a particular network connection. Here, all bits are initially set to a designated value (e.g., 0), which is flipped (e.g., changed from 0 to 1), by the hardware, upon the arrival of a data packet at the network connection. At each aging interval, the software conducts an atomic read-and-clear operation to capture the bit values related to each network connection, subsequently resetting them to their original state. During the read operation, should the bits remain consistent, this signifies that the corresponding network connection was inactive during that aging period. The software can subsequently release any resources allocated to maintaining that network connection. On the other hand, if the bit has flipped, then the corresponding network connection is considered active, and the software can continue to allocate resources for its maintenance. Here, the hardware is compelled to not only write a new value to the counter, which it is already configured to do for other functions (e.g., network analytics), but it must also read, set, and write a bit each time a data packet arrives at a corresponding network connection, thus requiring substantial resources for memory access.

Embodiments of the invention provide improved network resource management based on active connection determination using minimized memory access. To this end, embodiments of the invention implement a global counter, a local counter corresponding to each network connection, and a plurality of bits to determine whether the network connections are active. In example embodiments, the local counter may have a base portion and an extended portion. The base portion of the local counter may have a size of 56 bits and the extended portion of the local counter may have a size of 8 bits. When a data packet is received via a network connection, the hardware may determine a value of the extended portion of the local counter associated with the network connection. Importantly, since the local counter is already being accessed for other functions, determining the value of the extended portion of the local counter does not necessitate any additional memory access. During operation, the value of the extended portion of the local counter is configured to follow a value of the global counter.

The global counter may be used to represent the aging period number. Embodiments of the invention may use a value of a bit corresponding to a network connection to reflect the status of that network connection. For example, each bit may be initially set to a designated value (e.g., 0), which flips (e.g., changes from 0 to 1) upon the arrival of a data packet at the corresponding network connection. The software may determine the state of the network connections (e.g., active or inactive) by reading a current value of each bit that corresponds to a particular network connection. During the read operation, the software atomically clears the bits being read. The software may determine whether a network connection is still active by determining whether the corresponding value of the bit has flipped (e.g., from 0 to 1). If the value of the bit has not flipped, the software may determine that the network connection is inactive and can subsequently release any resources allocated to maintaining that network connection. After every full read operation, i.e., a read operation to read and clear all the bits corresponding to the network connections, the value of the global counter may be incremented.

Having determined the value of the extended portion of the local counter and the value of the global counter, the network adapter may determine if there is a mismatch between the two values. A mismatch indicates that the hardware has not received a packet for that aging period, and that the corresponding bit should be flipped (e.g., from 0 to 1) upon packet arrival during the aging period. As such, in response to determining there is a mismatch, the hardware may flip the value of the corresponding bit (e.g., from 0 to 1) and update the value of the extended portion of the local counter to reflect the value of the global counter. When the value of the extended portion of the local counter reaches its maximum representational value (e.g., if the size of the extended portion is 8 bits, the maximum representational value is 255), then the software sets the values of the extended portion of all the local counters to an invalid value. In doing so, the software may ensure that the mismatch in value continues to trigger the bit value flip (e.g., to set the bit value to 1). In this way, embodiments of the invention reduce the amount of computational resources needed to indicate the active network connections for resource allocation.

Embodiments of the present invention will now be described more fully hereinafter with reference to the accompanying drawings, in which some, but not all, embodiments are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, terms such as "top," "about," "around," etc. are used for explanatory purposes in the examples provided below to describe the relative position of certain components or portions of components.

As used herein, the terms "substantially" and "approximately" refer to tolerances within appropriate manufacturing and/or engineering standards or limits.

As used herein, "operatively coupled" may mean that the components are electrically coupled and/or are in or are capable of electrical communication with one another, or are optically coupled and/or are in or are capable of optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors, capacitors, and/or the like) located between the components that are operatively coupled together. Furthermore, "operatively coupled" may mean that the components are detachable from each other or that they are permanently coupled together.

Example Data Communication System

Figure 1:
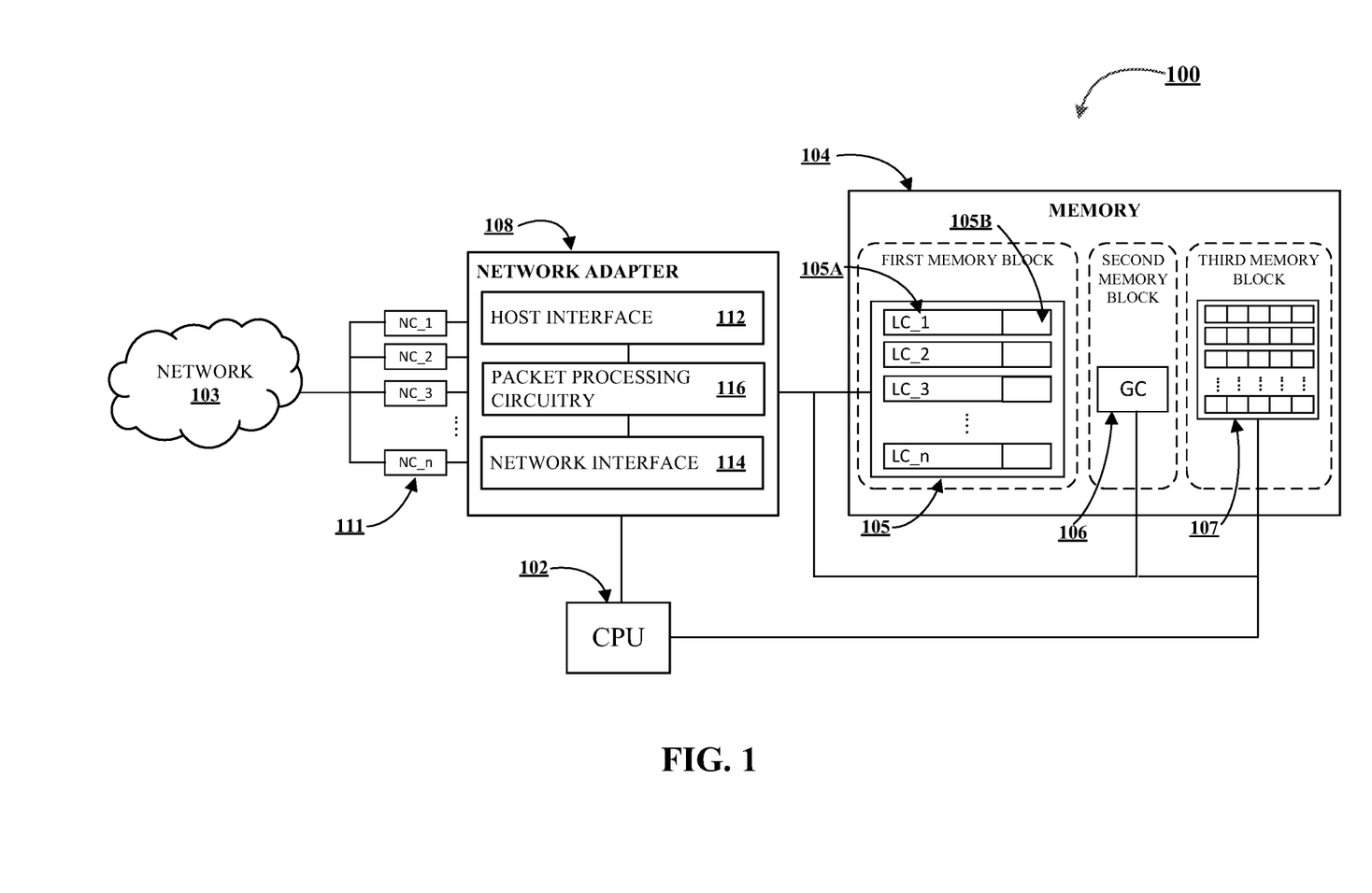
FIG. 1 illustrates a data communication system, in accordance with an embodiment of the present invention.

FIG. 1 illustrates a data communication system 100, in accordance with an embodiment of the present invention. As shown in FIG. 1, the data communication system 100 may include a host processor 102, and a memory 104 (also referred to as a system memory), which are connected to a suitable bus 110, such as a PCI Express® (PCIe) bus, as is known in the art. host processor 102 may include multiple processing cores (not shown) and may perform the functions described herein under the control of program instructions in software. This software may be downloaded to system 100 in electronic form, over a network, for example. Additionally or alternatively, the software may be stored in tangible, non-transitory computer-readable memory media, such as optical, magnetic, or electronic memory.

A network adapter 108, such as an IB host channel adapter (HCA), may connect the data communication system 100 to a network 103. The network adapter 108 may include a network interface 114 coupled to the network 103, and a host interface 112 coupled to the host processor 102 and memory 104 via a bus 110. Packet processing circuitry 116, coupled between the network interface 114 and the host interface 112, may generate outgoing packets for transmission over the network 103, as described below and may also process incoming packets received from the network. The host interface 112, the network interface 114, and the packet processing circuitry 116 may typically include dedicated hardware logic, the details of which will be apparent to those skilled in the art after reading the present description. Alternatively or additionally, at least some of the functions of the packet processing circuitry 116 may be implemented in software on a suitable programmable processor.

As shown in FIG. 1, the data communication system 100 may include a plurality of network connections NC_1, . . . , NC_n 111. A "network connection" may refer to a configured arrangement or linkage established between two or more computing devices, components, or systems that facilitates the transfer, reception, and/or exchange of data, commands, or other information. A network connection may be transient or persistent, direct or indirect, and may utilize any combination of wired, wireless, optical, or other transmission mediums. A network connection may be established, maintained, and terminated based on one or more communication protocols, standards, or methodologies that dictate the format, sequencing, error-checking, and other operational characteristics of the data exchange. For example, the network connection may be a transport control protocol (TCP)/Internet protocol (IP) connection, which is a specific type of network connection established between two or more computing devices, components, or systems using the TCP in conjunction with the IP to facilitate the reliable, ordered, and error-checked transfer, reception, and/or exchange of data, commands, or other information over interconnected networks. It is to be understood that the term "network connection" as used herein encompasses both the state of being interconnected as well as the mechanisms, devices, systems, protocols, or methodologies facilitating such interconnection.

For a network connection (e.g., NC_1, . . . . NC_n 111) to be established and maintained efficiently, certain requisite network resources are allocated, ensuring the reliable and seamless operation of said connection. In some embodiments, these network resources may include bandwidth allocation. Each network connection necessitates a specific amount of data transfer capacity, termed bandwidth. Proper management of bandwidth ensures that a singular connection does not monopolize the available capacity, thus maintaining equitable distribution across multiple connections. In another embodiments, these network resources may include memory utilization. Devices integral to the network, including but not limited to routers and switches, allocate memory segments to store information pertinent to active network connections, including elements like routing matrices and cache. In still other embodiments, network resources may include CPU load management. Network apparatuses undertake tasks requiring computational processing. The efficient apportionment of CPU resources is crucial to prevent potential overloads or service interruptions, especially during elevated connection or data transfer activities. In still other embodiments, network resources may include port number designation. Protocols such as TCP and UDP utilize port numbers to differentiate between services or operational sessions on identical devices. Upon introduction of a new connection, a unique port number is designated to that particular session. Other network resources may include IP addressing, management of routing table entries, session identifier allocation, allocation of security resources, physical port designation, and/or the like. It should be noted that the aforementioned network resources represent a subset of potential considerations, and the list is not exhaustive in the context of the diverse and evolving landscape of network connectivity.

As shown in FIG. 1, the memory 104 may include a first memory block, a second memory block, and a third memory block. In some embodiments, the first memory block may be operatively coupled to the network adapter 108. The first memory block may include one or more local counters 105, each corresponding to a network connection NC_1, . . . , NC_n 111. The local counter 105 may be used to monitor, manage, and/or optimize specific parameters or data points associated with its corresponding network connection 111. In some embodiments, the local counter 105 may include a base portion 105A and an extended portion 105B. The base portion of the local counter 105A may be configured for a number of different uses, such as performance monitoring, bandwidth measurement, error detection, traffic analysis, network analytics, tracking a data payload, tracking a number of data packets received via the corresponding network connection, and/or the like. In example embodiments, the base portion of the local counter 105A may have a size of 56 bits. The extended portion of the local counter 105B may be configured to monitor the activity of the network connection 111 associated therewith. When a data packet arrives at the network connection 111, the network adapter 108 may increment the value of the extended portion of the local counter 105B corresponding to the network connection. For example, when a data packet arrives at network connection NC_1, the network adapter 108 may increment the value of the extended portion of the local counter LC_1. In example embodiments, the extended portion of each local counter 105B may have a size of 8 bits.

In some embodiments, the second memory block may be operatively coupled to the network adapter 108. The second memory block may include a global counter 106 that is configured to represent the aging period number. In some embodiments, the global counter 106 may represent a time duration after which a network connection may be considered inactive. The purpose of implementing an aging period is to manage and optimize the utilization of network resources, ensuring that stale or unused resources are freed up for other active connections or task. In example embodiments, the size of the global counter 106 may be 8 bits.

In some embodiments, the third memory block may be operatively coupled to the network adapter 108 and the host processor 102. The third memory block may include a plurality of bits 107 corresponding to the plurality of network connections NC_1, . . . , NC_n 111. Each bit may initially be set to a designated value (e.g., 0), which flips (e.g., from 0 to 1) upon the arrival of a data packet at the corresponding network connection. In this way, the host processor 102 may determine the state of the network connections 111 (e.g., active or inactive) by reading a current value of each bit 107 that corresponds to a particular network connection 111.

In some embodiments, after every full read operation, e.g., a read operation to read and atomically clear all the bits 107 corresponding to the network connections 111, the host processor 102 may increment the value of the global counter 106. In other words, the host processor 102 may read the value of the plurality of bits 107 once every aging period. As described in more detail herein, when a data packet is received from at a network connection 111, the network adapter 108 retrieves the value of the extended portion of the local counter 105B corresponding to that network connection 111 from the first memory block. In addition, the network adapter 108 captures the value of the global counter 105 from the second memory block. Upon retrieving the two values, the network adapter 108 compares the value of the extended portion of the local counter 105B and the value of the global counter 106 to determine a match. If there is a mismatch, the value of the extended portion of the local counter 105B is updated to match the value of the global counter 106. In addition, the network adapter 108 may set the value of the corresponding bit 107, e.g., flip the value of the corresponding bit (e.g., from 0 to 1) to indicate that the network connection 111 is active. In this way, the network adapter 108 may ensure the value of the extended portion of the local counter 105B and the value of the global counter 106 are synchronized and the connection's status is correctly represented. In this way, the value of the extended portion of the local counter 105B follows the value of the global counter 106.

Example Methods for Improved Network Resource Management

Figure 2:
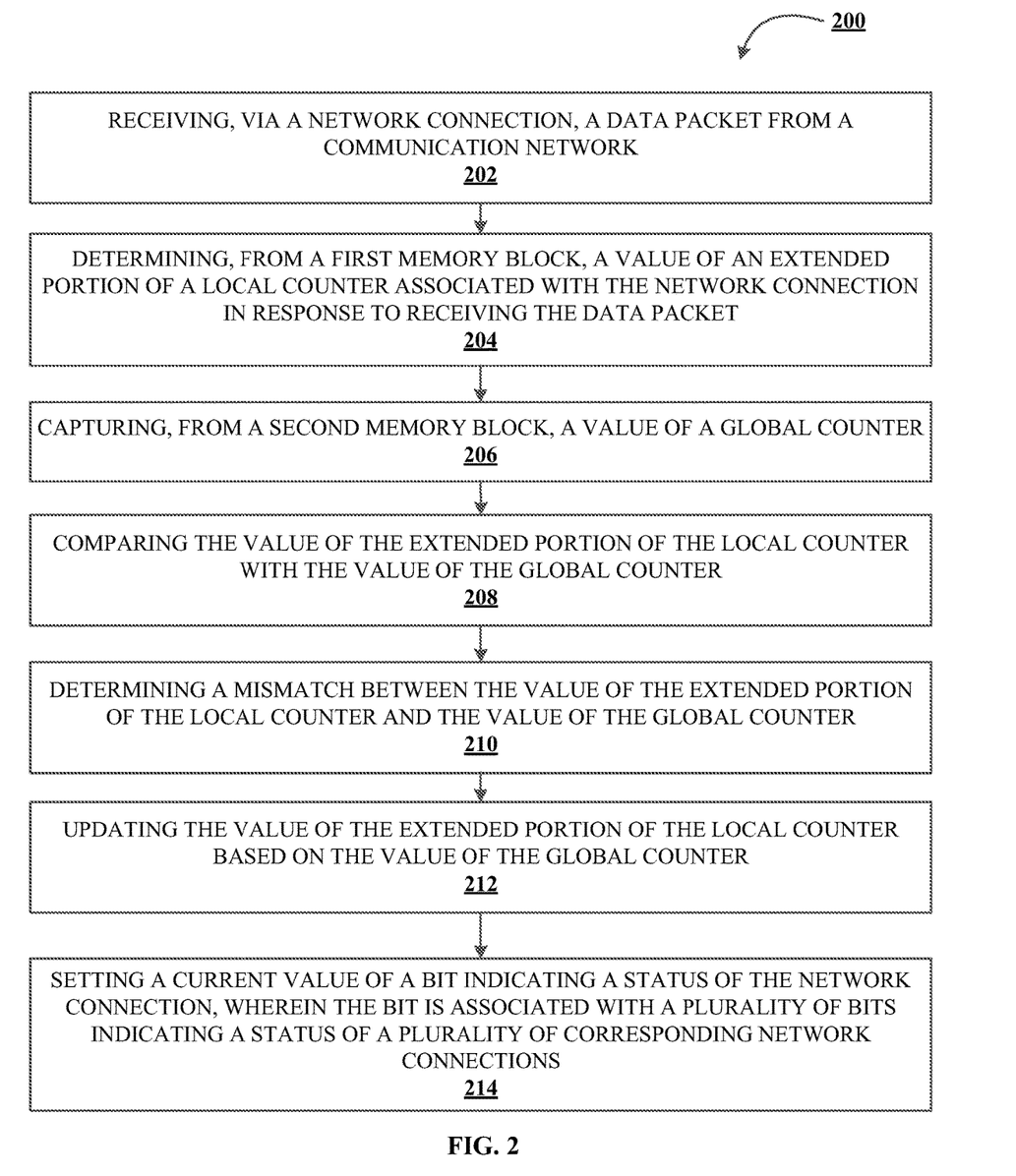
FIG. 2 illustrates a method for updating the status of a network connection for improved network resource management, in accordance with an embodiment of the invention.

FIG. 2 illustrates a method 200 for updating a status of a network connection for improved network resource management, in accordance with an embodiment of the invention. As shown in block 202, the method may include receiving, via a network connection, a data packet from a communication network. As described herein, a network connection may refer to an arrangement between two or more computing entities to transfer or exchange data, utilizing various mediums like wired, wireless, or optical channels. The network connection may be transient or persistent, direct or indirect, and may follow specific communication protocols, such as the TCP/IP, to ensure reliable and structured data exchange. The network connection may receive multiple data packets over its operational span. The activity status of a network connection is dynamically determined based on the receipt of data packets: if a packet arrives within a predefined aging period, it is an indication that the network connection is active. In example embodiments, the aging period serves as a temporal threshold, ensuring timely data communication and allowing the system to ascertain the status of each individual connection.

While the described method provides a singular reference to "data packet" and "network connection," it should be understood that this is illustrative and not limiting. In various embodiments as described herein, the system may be capable of handling multiple network connections simultaneously, and each of these connections may receive numerous data packets. The singular reference to "data packet" and "network connection" is to simplify the explanation of the process.

As shown in block 204, the method may include determining, from a first memory block, a value of an extended portion of a local counter associated with the network connection in response to receiving the data packet. As described herein, the local counter may include a base portion and an extended portion. The base portion (e.g., sized at 56 bits) may manage varied tasks such as performance tracking, error detection, and data packet count. The extended portion (e.g., sized at 8 bits) may track the activity of a corresponding network connection, incrementing its value with every received data packet.

As shown in block 206, the method may include capturing, from a second memory block, a value of a global counter. As described herein, the global counter may be used to denote the aging period number. In example embodiments, the global counter (e.g., sized at 8 bits) may symbolize the time frame after which the status of the network connection may be assessed.

As shown in block 208, the method may include comparing the value of the extended portion of the local counter with the value of the global counter. By comparing the value of the extended portion of the local counter with the value of the global counter, the system can ensure that the values of the extended portion of the local counter and the global counter are synchronized, and the status of the network connection is correctly represented.

As shown in block 210, the method may include determining a mismatch between the value of the extended portion of the local counter and the value of the global counter. As described herein, a mismatch between the value of the extended portion of the local counter and the value of the global counter may indicate that the network adapter has not received a data packet via the network connection for that aging period, and that the corresponding bit should be flipped (e.g., from 0 to 1) upon data packet arrival during the aging period. In response, the method may include updating the value of the extended portion of the local counter based on the value of the global counter (e.g., to reflect the value of the global counter), as shown in block 212. In addition, in response to determining there is a mismatch, the method may also include setting a current value of a bit indicating a status of the network connection (e.g., flipping the value of the corresponding bit from 0 to 1), wherein the bit is associated with a plurality of bits indicating a status of a plurality of corresponding network connections, as shown in block 214.

Figure 3:
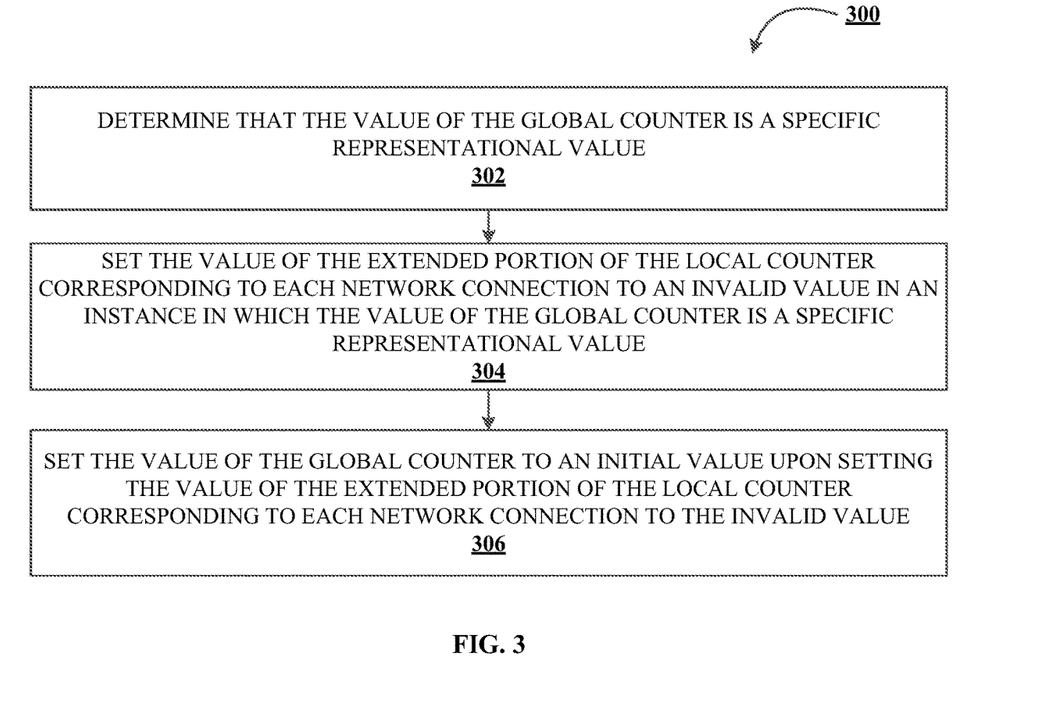
FIG. 3 illustrates a method for resetting the second portion of a local counter and a global counter, in accordance with an embodiment of the invention.

FIG. 3 illustrates a method for resetting the extended portion of the local counter and the global counter 300, in accordance with an embodiment of the invention. As shown in block 302, the method may include determining that the value of the global counter is a specific representational value. In example embodiments, the specific representational value may be a maximum capacity of the global counter. For example, a global counter with a size of 8 bit has a maximum capacity of 255.

As shown in block 304, the method may include setting the value of the extended portion of the local counter corresponding to each network connection to an invalid value in an instance in which the value of the global counter is a specific representational value. As described herein, in example embodiments, the size of the extended portion of the local counter is the same as the size of the global counter. As such, the maximum capacity of the extended portion of the local counter is 255. Since the extended portion of the local counter follows the global counter, having both of their values be at a maximum value of 255 will likely result in a deadlock. Therefore, upon determining that the value of the global counter has reached its maximum capacity, the method may include setting the value of the extended portion of the local counter to an invalid value.

As shown in block 306, the method may include setting the value of the global counter to an initial value upon setting the value of the extended portion of the local counter corresponding to each network connection to the invalid value. In example embodiments, the value of the global counter is set to 0. By forcing such a misalignment between the value of the global counter and the value of the extended portion of the local counter, the system may continue to identify active network connections inadvertently locking both counters into a stagnant state or causing a deadlock in their values.

Figure 4:
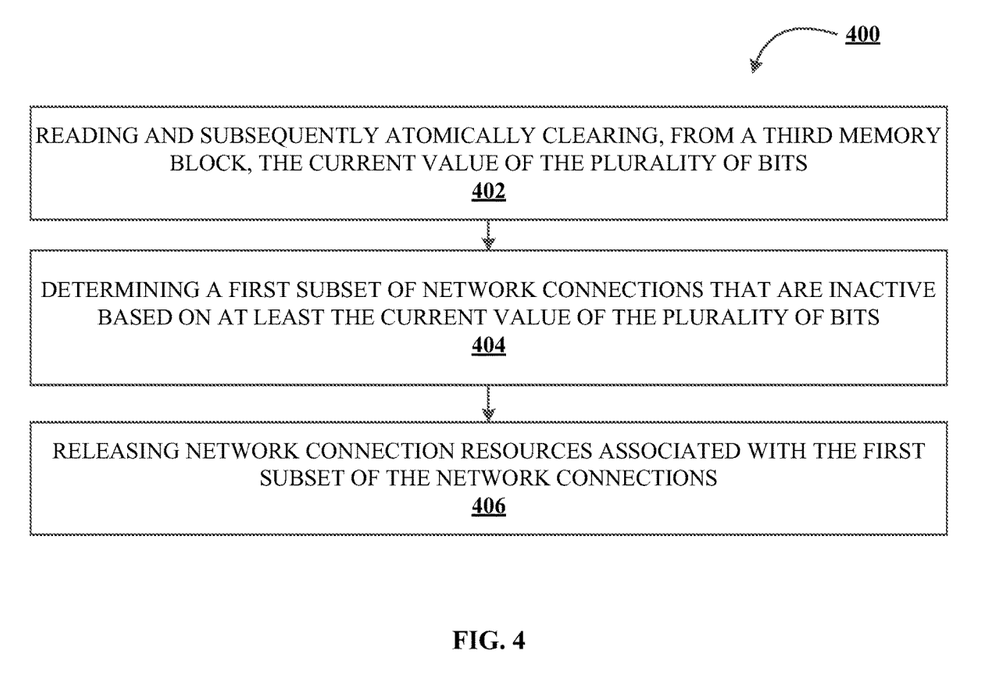
FIG. 4 illustrates a method for releasing network resources associated with a network connection, in accordance with an embodiment of the invention.

FIG. 4 illustrates a method for releasing network resources associated with a network connection 400, in accordance with an embodiment of the invention. As shown in block 402, the method may include reading and subsequently atomically clearing, from a third memory block, the current value of the plurality of bits. As described herein, the third memory block may include a plurality of bits corresponding to the plurality of network connections. Each bit may initially be set to a designated value (e.g., 0), which flips (e.g., from 0 to 1) upon the arrival of a data packet at the corresponding network connection. In some embodiments, by atomically clearing the bits, the system may ensure that the clearing process remains substantially uninterrupted from external or concurrent interventions.

As shown in block 404, the method may include determining a first subset of network connections that are inactive based on at least the current value of the plurality of bits. In some embodiments, if the bit value corresponding to a network connection remains at the initial designated value (e.g., 0), the system may determine that the network connection has not received a data packet for the duration of the aging period. In response, the status of the network connection may be deemed as inactive. On the other hand, if the bit value corresponding to the network connection has flipped from its initial designated value (e.g., flipped from 0 to 1), then the system may determine that the network connection has received a data packet during the aging period, and will thus deem the status of the network connection as active. Here, the first subset of network connections is deemed inactive as their corresponding bits have not changed from their initial designated value.

As shown in block 406, the method may include releasing network connection resources associated with the first subset of the network connections. Upon determining that the first subset of network connections is inactive, the method may include releasing the network resources assigned for maintenance and management of the first subset of network connections. In doing so, these network resources may be reallocated to other network connections.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computing apparatus for improved network resource management, comprising:
    a network adapter operatively coupled to a communication network;
    a first memory block operatively coupled to the network adapter;
    a second memory block operatively coupled to the network adapter; and
    a third memory block operatively coupled to the network adapter, wherein the third memory block comprises a plurality of bits indicating a status of a plurality of corresponding network connections,
    wherein the network adapter is configured to:
        receive, via a network connection, a data packet from the communication network;
        determine, from the first memory block, a value of an extended portion of a local counter associated with the network connection in response to receiving the data packet;
        capture, from the second memory block, a value of a global counter;
        compare the value of the extended portion of the local counter with the value of the global counter; and
        in an instance in which the comparison identifies a mismatch:
            update the value of the extended portion of the local counter based on the value of the global counter; and
            set a current value of a bit indicating a status of the network connection, wherein the bit is associated with the plurality of bits.

2. The computing apparatus of claim 1, further comprising:
    a host processor, wherein the host processor is configured to:
        read and subsequently atomically clear, from the third memory block, the current value of the plurality of bits;
        determine a first subset of network connections that are inactive based on at least the current value of the plurality of bits; and
        release network connection resources associated with the first subset of the network connections.

3. The computing apparatus of claim 2, wherein the host processor is configured to:
    increment the global counter in response to reading the current value of the plurality of bits from the third memory block.

4. The computing apparatus of claim 2, wherein the host processor is configured to read the current value of the plurality of bits once every aging period.

5. The computing apparatus of claim 2, wherein the host processor is further configured to:
    determine that the value of the global counter is a specific representational value; and
    set the value of the extended portion of the local counter corresponding to each network connection to an invalid value in an instance in which the value of the global counter is equal to the specific representational value.

6. The computing apparatus of claim 5, wherein the host processor is further configured to:
    set the value of the global counter to an initial value upon setting the value of the extended portion of the local counter corresponding to each network connection to the invalid value.

7. The computing apparatus of claim 5, wherein the specific representational value is a maximum representational value for the global counter.

8. The computing apparatus of claim 1, wherein a size of the extended portion of the local counter is equal to a size of the global counter.

9. The computing apparatus of claim 1, wherein the local counter associated with the network connection is configured to track a data payload and a number of data packets received via the network connection.

10. The computing apparatus of claim 1, wherein the network connection comprises a transport control protocol (TCP)/Internet protocol (IP) connection.

11. A method for improved network resource management, the method comprising:
    receiving, via a network connection, a data packet from a communication network;
    determining, from a first memory block, a value of an extended portion of a local counter associated with the network connection in response to receiving the data packet;
    capturing, from a second memory block, a value of a global counter;
    comparing the value of the extended portion of the local counter with the value of the global counter; and
    in an instance in which the comparison identifies a mismatch:
        updating the value of the extended portion of the local counter based on the value of the global counter; and
        setting a current value of a bit indicating a status of the network connection, wherein the bit is associated with a plurality of bits indicating a status of a plurality of corresponding network connections.

12. The method of claim 11, wherein the method further comprises:
    reading and subsequently atomically clearing, from a third memory block, the current value of the plurality of bits;
    determining a first subset of network connections that are inactive based on at least the current value of the plurality of bits; and
    releasing network connection resources associated with the first subset of the network connections.

13. The method of claim 12, wherein the method further comprises incrementing the global counter in response to reading the current value of the plurality of bits from the third memory block.

14. The method of claim 12, wherein the method further comprises reading the current value of the plurality of bits once every aging period.

15. The method of claim 12, wherein the method further comprises:
   determining that the value of the global counter is a specific representational value; and
   setting the value of the extended portion of the local counter corresponding to each network connection to an invalid value in an instance in which the value of the global counter is equal to the specific representational value.

16. The method of claim 15, wherein the method further comprises:
   setting the value of the global counter to an initial value upon setting the value of the extended portion of the local counter corresponding to each network connection to the invalid value.

17. The method of claim 15, wherein the specific representational value is a maximum representational value for the global counter.

18. The method of claim 11, wherein a size of the extended portion of the local counter is equal to a size of the global counter.

19. The method of claim 11, wherein the local counter associated with the network connection is configured to track a data payload and a number of data packets received via the network connection.

20. The method of claim 11, wherein the network connection comprises a transport control protocol (TCP)/Internet protocol (IP) connection.

21. A computing apparatus for improved network resource management, comprising:
   a network adapter operatively coupled to a communication network;
   a memory operatively coupled to the network adapter;
   wherein the network adapter is configured to:
      receive, via a network connection, a data packet from the communication network;
      determine, from the memory, a value of an extended portion of a local counter associated with the network connection in response to receiving the data packet;
      capture, from the memory, a value of a global counter;
      compare the value of the extended portion of the local counter with the value of the global counter; and
   in an instance in which the comparison identifies a mismatch, update the value of the extended portion of the local counter based on the value of the global counter.

22. The computing apparatus of claim 21, wherein the memory comprises a first memory block, a second memory block, and a third memory block, wherein the first memory block comprises the value of the extended portion of the local counter associated with the network connection, the second memory block comprises the value of the global counter, and the third memory block comprises a plurality of bits indicating a status of a plurality of corresponding network connections.

23. The computing apparatus of claim 22, wherein the network adapter is further configured to:
   set a current value of a bit indicating a status of the network connection, wherein the bit is associated with the plurality of bits.

* * * * *